United States Patent [19]
Anscher

[11] Patent Number: 5,842,256
[45] Date of Patent: Dec. 1, 1998

[54] MODULAR ATTACHMENT SYSTEM FOR HATS, BADGES AND THE LIKE

[75] Inventor: Joseph Anscher, Muttontown, N.Y.

[73] Assignee: National Molding Corporation, Farmingdale, N.Y.

[21] Appl. No.: 949,840

[22] Filed: Oct. 14, 1997

[51] Int. Cl.[6] .................................................. A44B 19/02
[52] U.S. Cl. .............................. 24/3.4; 24/170; 24/600.9
[58] Field of Search .......................... 24/3.4, 3.12, 3.13, 24/265 BC, 265 EC, 134 R, 168, 170, 600.9, 599.5, 343, 344, 346, 643, 298, 301, 302, 306

[56] References Cited

U.S. PATENT DOCUMENTS

| | | | |
|---|---|---|---|
| 4,586,499 | 5/1986 | Kaletzky | 24/346 X |
| 5,027,477 | 7/1991 | Seron | 24/3.4 |
| 5,121,865 | 6/1992 | Howard | 24/306 X |
| 5,274,887 | 1/1994 | Fudaki | 24/600.9 X |
| 5,365,642 | 11/1994 | Reduc et al. | 24/600.9 |
| 5,475,901 | 12/1995 | Anscher | 24/600.9 X |
| 5,561,891 | 10/1996 | Hsieh | 24/170 X |
| 5,582,337 | 12/1996 | McPherson et al. | 24/306 X |

Primary Examiner—James R. Brittain
Assistant Examiner—Robert J. Sandy
Attorney, Agent, or Firm—Kenyon & Kenyon

[57] ABSTRACT

A modular attachment system for an object holding system or object displaying system that comprises a base section that engages a cord and an attachment section that secures the object to be held or displayed. The cord may be worn by a person such that the object, for example, an identification badge, key ring, and so forth, is held and/or displayed. Various types of attachment sections may be used with a single base section, thus allowing substitution and flexibility in providing appropriate systems for various situations. The attachment system may be made from molded plastic in a lightweight, cost-effective and aesthetically pleasing manner.

16 Claims, 6 Drawing Sheets

5,842,256

MODULAR ATTACHMENT SYSTEM FOR HATS, BADGES AND THE LIKE

FIELD OF THE INVENTION

The present invention is directed to attachment systems for the holding and/or display of objects. More specifically, the present invention provides a modular attachment system for use in, for example, the holding and display of various objects, such as hats, identification badges, and similar objects.

BACKGROUND INFORMATION

Systems are known for the holding and display of objects such as hats, badges, whistles, keys, and so forth. These systems generally comprise a cord or similar wire-type material that may be worn by a person, for example, around the neck or around the wrist. Attached to the cord is an attachment piece, such as an alligator clip or a hook, for holding various objects. For example, in the case of an alligator clip, a badge or other object to be displayed can be secured by the alligator clip. Also, in the case of a hook, a whistle or keys can be attached to the hook.

These holding/display systems are inflexible, in that they are necessarily limited to a single type of attachment piece per system. Thus, a manufacturer that would like to provide display systems for badges and also provide hat keepers would need to manufacture entirely separate systems for each purpose. The manufacturer will thus be unable to flexibly respond to demand for any specific type of display/holding system.

SUMMARY OF THE INVENTION

The present invention provides a modular attachment system that allows different attachment sections to be used with a single base and cord combination. The attachment section (for example, a clip hook or gripper) is coupled to the base section to implement the holding and/or displaying function. Since multiple attachment sections can be used with the base section, a display/holding system can be provided with flexibility for use in various situations.

In an exemplary embodiment, the attachment system of the present invention comprises a base section and an attachment section. The base section may be constructed of two pieces that interlock, allowing the attachment section to be secured to the base section once the two pieces have been secured together, and allowing a cord to be secured to the base section. Exemplary means for mating the base section to the attachment section are provided, for example, via a swivel post with an enlarged cap, wherein the swivel post is engaged with a surrounding collar in the base section. This configuration gives the added benefit of rotational freedom for the object being held/displayed. Exemplary means for coupling the cord to the base section are also provided, including, for example, a crimping arm, multiple forked members, and multi-toothed member.

The attachment section of the present invention may comprise a gripper or a clip hook, although other types of attachment sections are also possible. The base and attachment sections can be formed out of any suitable material. Molded plastic is preferable as being lightweight and aesthetically pleasing.

DETAILED DESCRIPTION OF THE DRAWINGS

Figure 1:
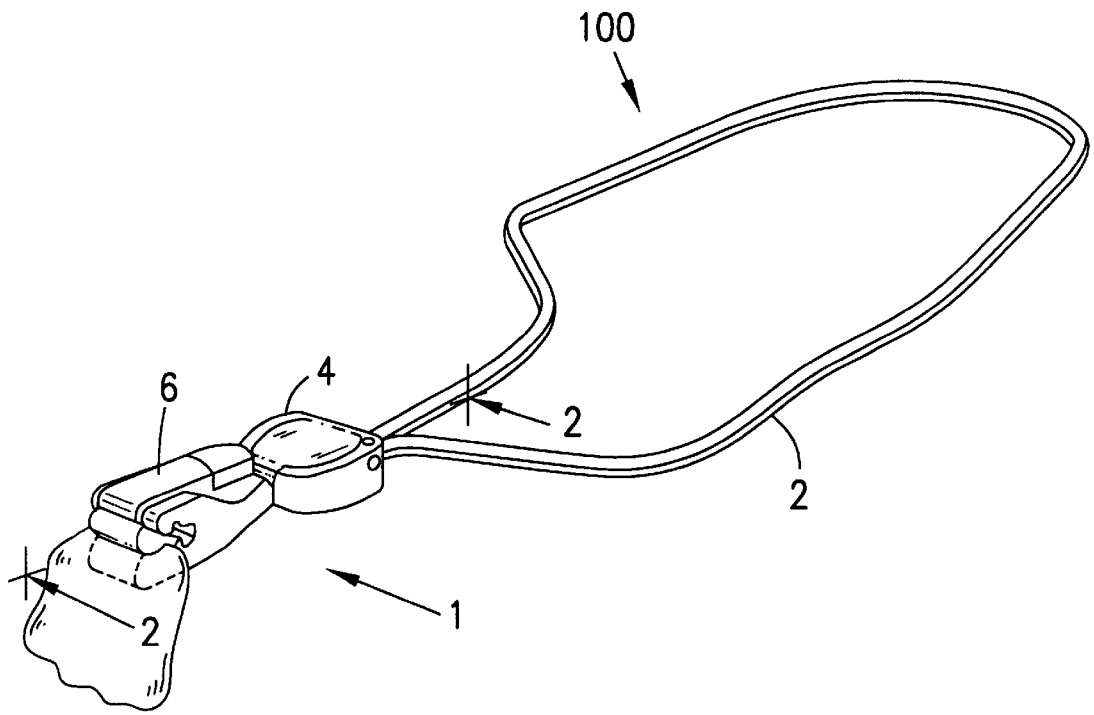
FIG. 1 shows a perspective view of an exemplary embodiment of an attachment system according to the present invention.
Figure 2:
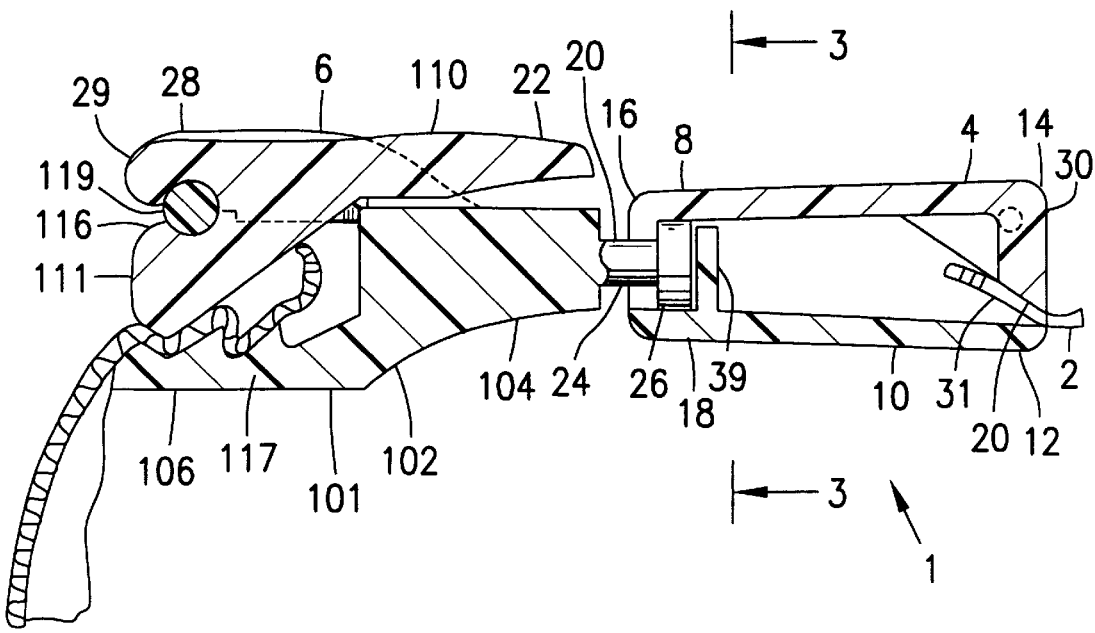
FIG. 2 shows a cross-sectional view of the attachment system according to the present invention along the line 2—2 of FIG. 1.
Figure 3:
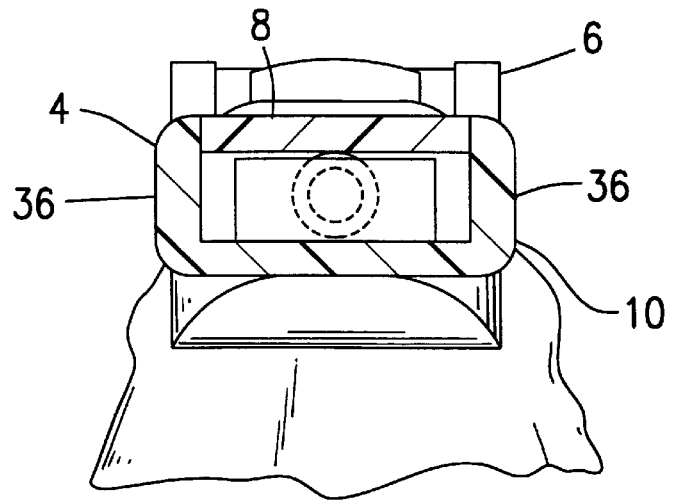
FIG. 3 shows a cross-sectional view of the attachment system according to the present invention along the line 3—3 of FIG. 2.

The attachment system according to the present invention can be illustrated by FIGS. 1–14, which depict an exemplary embodiment of the present invention. An attachment system 1 is connected to a cord 2 as part of an object holding system 100. Attachment system 1 includes base section 4 and attachment section 6. In the case of FIGS. 1–3, the attachment section 6 is a gripper element 101 (described below), although it will become apparent that other types of attachment sections may be used in conjunction with base section 4. Attachment section 6 is shown engaged with a fabric, such that the fabric is tightly gripped.

FIG. 2 further details the exemplary embodiment. Exemplary base section 4 comprises a top piece 8 and a bottom piece 10. As shown, top piece 8 and bottom piece 10 are interlocked in a closed position, forming the base section 4. A cord connection area 12 is located at a top end 14 of the base section 4, such that the cord 2 is coupled to the base section 4. Cord coupling may be achieved by, for example, a crimping caused by the interlocking of top piece 8 and bottom piece 10. Other possibilities for attaching the cord 2 to the base section 4 may also be used, as will be described below, and as will be apparent to those with skill in the art.

A bottom end 16 of the base section 4 includes an attachment section mating area 18. As shown by FIG. 2, the exemplary attachment section mating area 18 comprises a surrounding collar arrangement, i.e., the top piece 8 and bottom piece 10 are formed to create a narrow opening and a larger space behind the opening. The surrounding collar arrangement is thereby capable of receiving, for example, a swivel post having an enlarged cap and securing same when the top piece 8 and bottom piece 10 are interlocked in the closed position.

Top piece 8 and bottom piece 10 become interlocked when they are joined together in the closed position. Interlocking can be achieved via an interlocking mechanism 20. The interlocking mechanism 20 can take various forms, as will be generally apparent from the following discussion. For example, as shown in FIG. 2 and described more fully below, interlocking can be achieved by providing a negatively sloped edge face 31 at the end of a crimping arm 30.

Base section 2 may be implemented in various configurations. The following describes three such configurations. As will be appreciated by those with skill in the art, the particular structures used to form the cord connection area 12, attachment section mating area 18, and interlocking mechanism 20 for each example may generally be used with any other configuration. The following examples thus provide illustration of some of the various implementations available.

Figure 5:
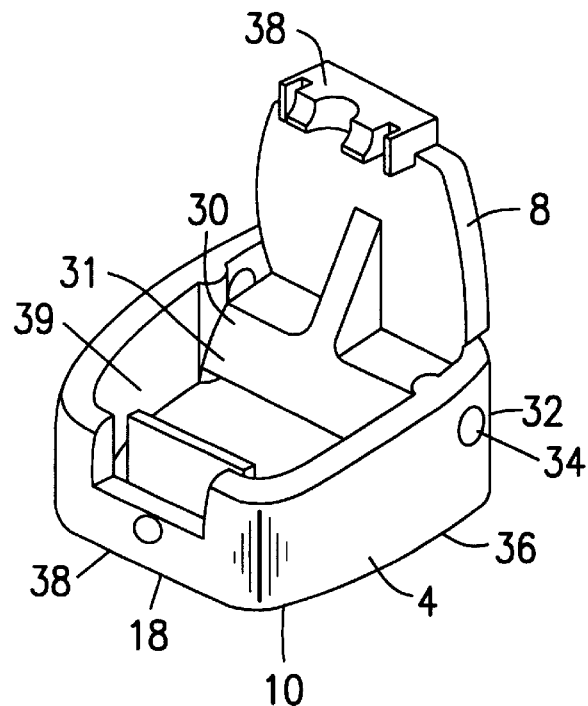
FIG. 5 shows a perspective view of a first exemplary base section in an open position, according to the present invention.
Figure 6:
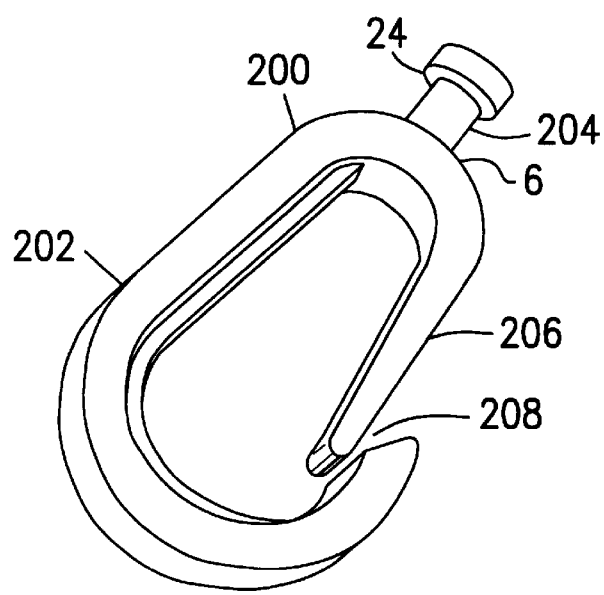
FIG. 6 shows a perspective view of an exemplary clip hook as an attachment section, according to the present invention.

For example, base section 4 may be configured as detailed in FIG. 5 (and shown in FIGS. 1 and 2), which includes a top piece 8 that is rotatably coupled to bottom piece 10. Accordingly, in FIG. 5, the cord connection area 12 is formed from a crimping arm 30 which extends from the top end 14 of top piece 8 approximately perpendicular to top piece 8 and directly toward bottom piece 10. To effect the rotational function, pins 32 extrude laterally from each side of crimping arm 30, and engage holes 34 formed in each side wall 36 of bottom piece 10. Attachment section mating area 18 is formed, for example, as a surrounding collar, partially by top piece 8 (which includes a semi-circular notch 38) and partially by bottom piece 10 (which includes a corresponding semi-circular notch 38). Backing member 39 extends from bottom piece 10 a sufficient distance behind the surrounding collar to permit, for example, a swivel post (see FIG. 2) to occupy the space defined between the two. Backing member 39 thus provides a block to prevent vertical movement of the swivel post.

Interlocking is achieved via a negatively sloped edge face 31 formed at the end of crimping arm 30 facing bottom piece 10. As discussed further below, when the top piece 8 is moved into the closed position, crimping arm 30 impinges upon cord 2. The negatively sloped edge face 31 allows the resistive force of the cord 2 to be realized as a downward force on the top piece 8 by virtue of the fulcrum effect of the pins 32. Also, any pulling force applied to the cord 2 will also be translated by the negatively sloped edge face 31 into downward force on top piece 8 by virtue of the fulcrum effect of pins 32.

In an open position, top piece 8 extends perpendicularly away from bottom piece 10, and, accordingly, crimping arm 30 extends parallel to bottom piece 10, allowing, for example, cord 2 to enter cord connection area 12. When top piece 8 is rotated into the closed position, crimping arm 30 impinges upon cord 2 in the cord connection area 12, thus creating a frictional connection between the base section 4 and the cord 2. Also in the closed position, the top piece 8 and bottom piece 10 form a surrounding collar to engage, for example, a swivel post from attachment section 6 (see FIG. 2). Interlocking of top piece 8 and bottom piece 10 is achieved via resistive force applied by cord 2 to the negatively sloped edge face 31.

Figure 13:
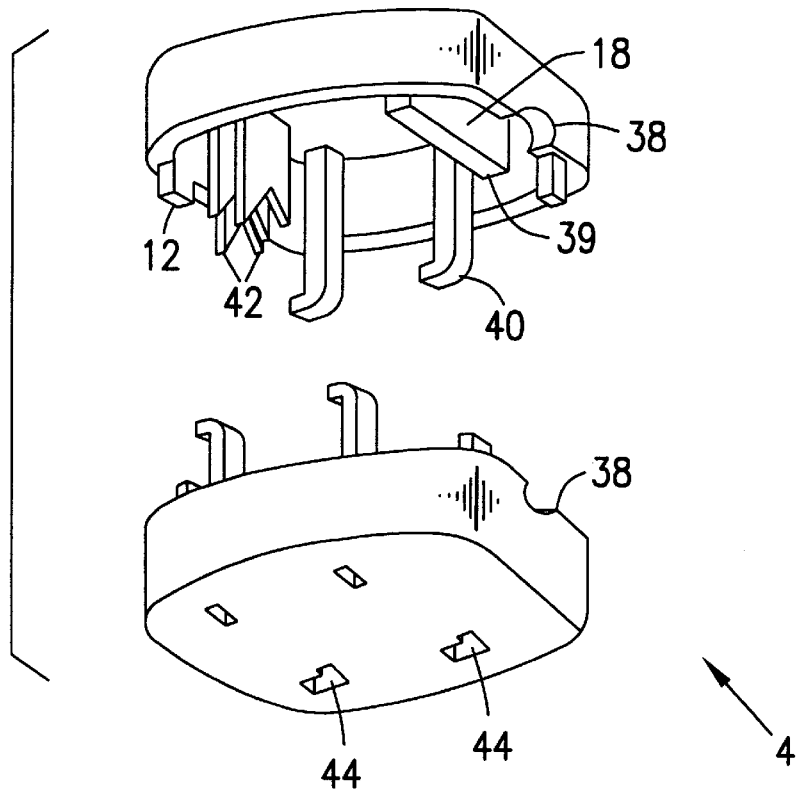
FIG. 13 shows a perspective view of a second exemplary base section according to the present invention.

A second configuration of base section 4 is shown by FIG. 13, which shows top piece 8 as separate from bottom piece 10 in the open position. Similar to the configuration shown by FIG. 5, attachment section mating area 18 comprises, for example, a surrounding collar formed partially in top piece 8 as a semi-circular notch 38 and bottom plate 10 as a corresponding semi-circular notch 38. Backing member 39 in this example extends from the top piece 8. Cord connection area 12 is formed as two forked members 42 extending from top piece 8 toward bottom piece 10 and partially as an opposing member (not shown) extending from bottom piece 10 toward top piece 8. To achieve interlocking between top piece 8 and bottom piece 10, snap members 40 are provided on top piece 8 and bottom piece 10. These snap member 40 engage corresponding interlock holes 44 in top piece 8 and bottom piece 10.

When the top piece 8 and bottom piece 10 are engaged to interlock in a closed position, the two forked members 42 and the opposing member (not shown) act to crimp, for example, a cord 2 interposed in the cord connection area 12, and thereby couple the base section 4 to cord 2. The surrounding collar formed by notches 38 acts to couple the attachment section 6 to base section 4 via, for example, a swivel post interposed in the attachment section mating area 18.

Figure 14:
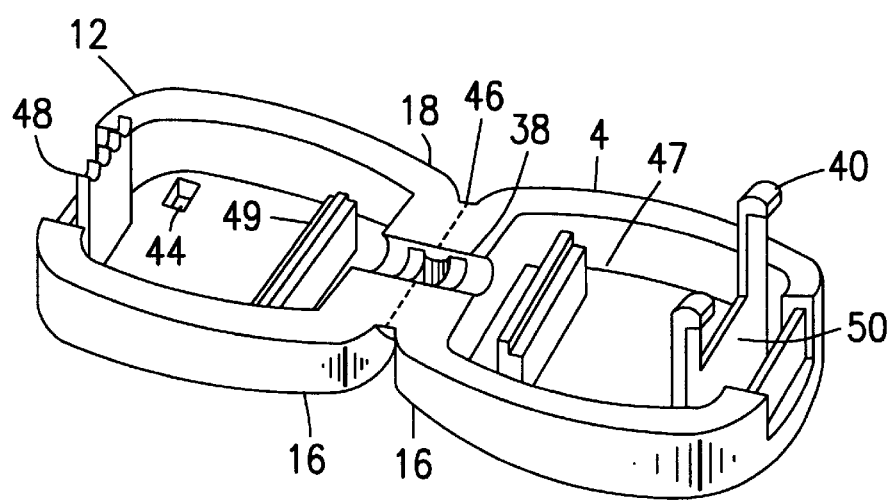
FIG. 14 shows a perspective view of a third exemplary base section according to the present invention.
Figure 1:
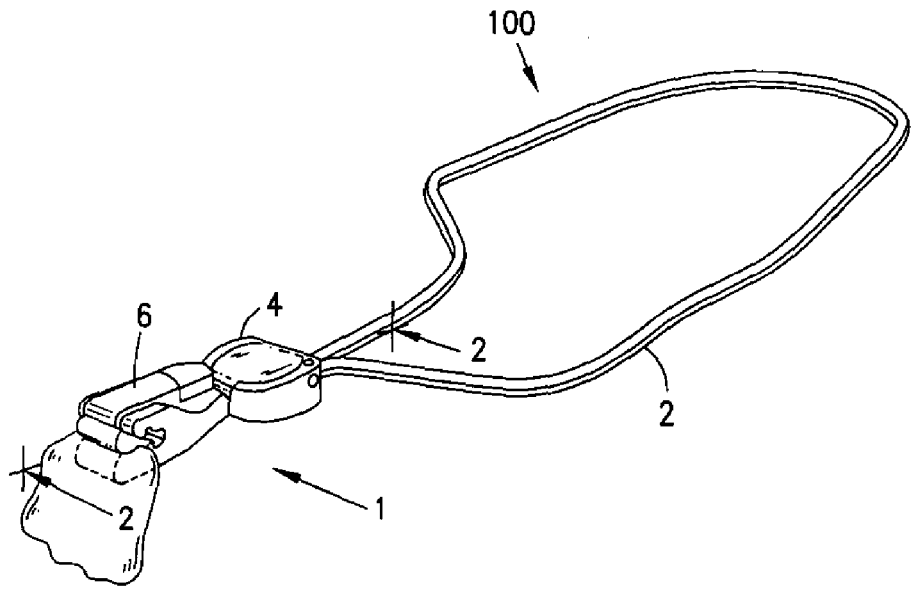
Figure 2:
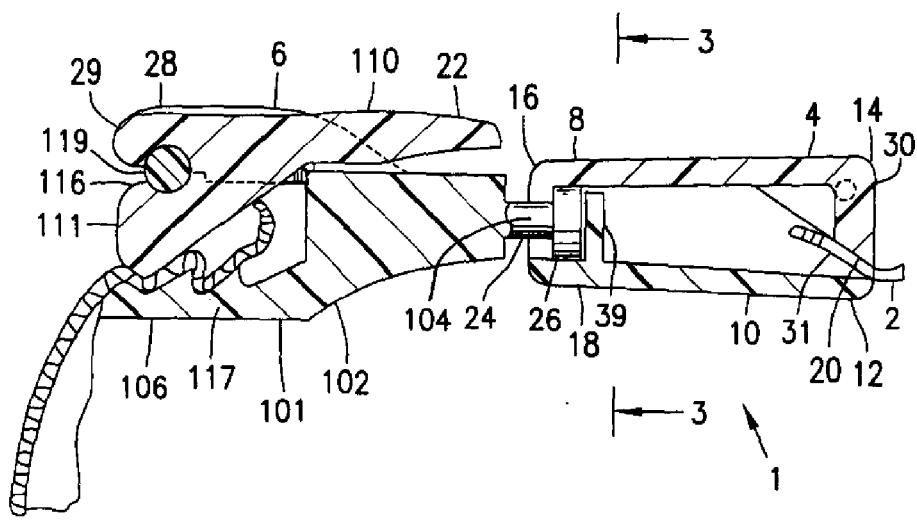
Figure 3:
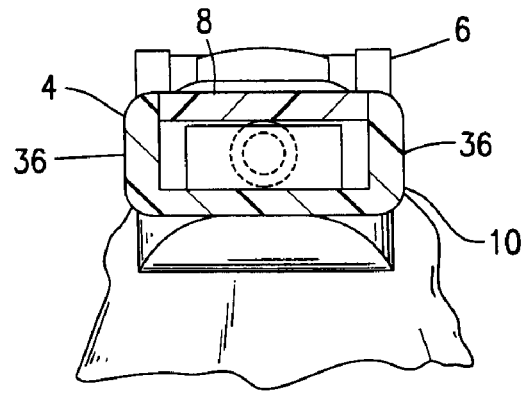
Figure 4:
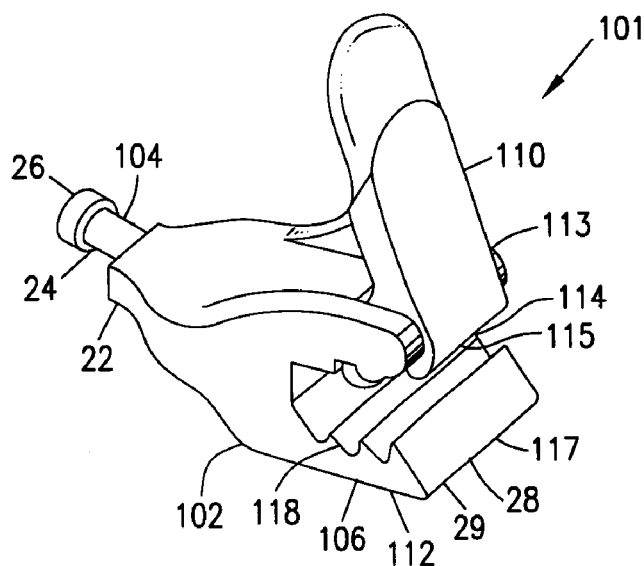
Figure 7:
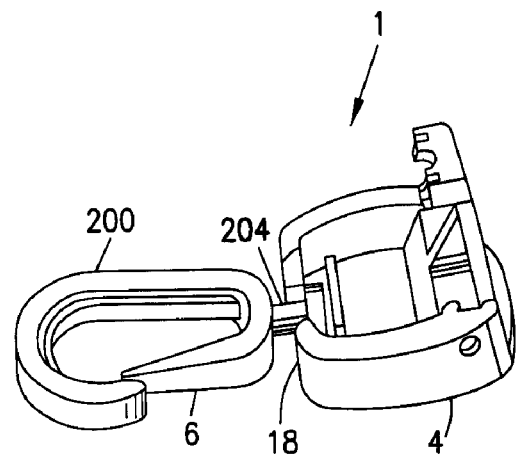
Figure 8:
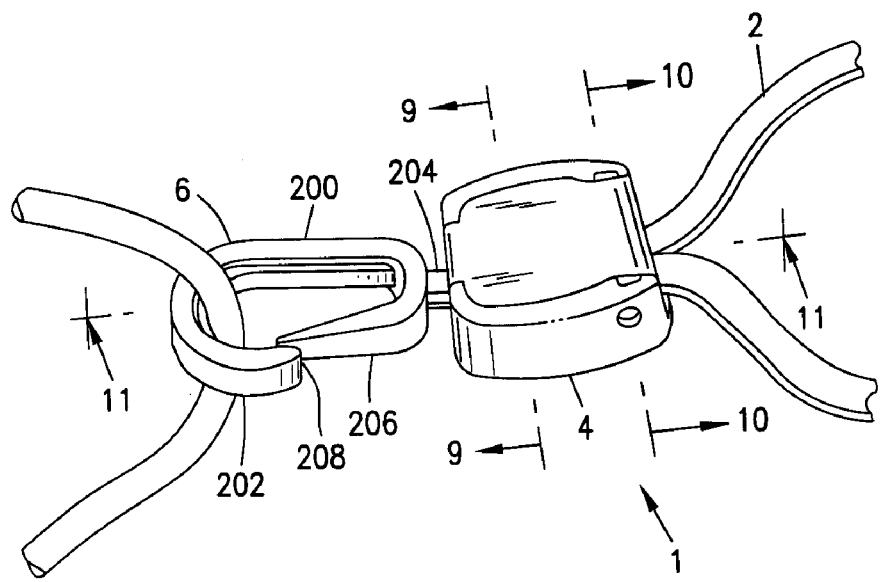

A third configuration of base section 4 is shown by FIG. 14, which shows top piece 8 connected with bottom piece 10 via a hinge 46 formed, for example, from a thin layer of material common to both the top piece 8 and bottom piece 10 at the bottom end 16. An advantage of this configuration is that the top piece 8 and bottom piece 10 may be formed as a single element in the molding process. The base section 4 of FIG. 14 shows an attachment section mating area 18 formed again by opposing corresponding semi-circular notches 38 in top piece 8 and bottom piece 10. In the example, backing member 39 is achieved by a top backing piece 47 extending from top piece 8 and a bottom backing piece 49 extending from bottom piece 10. Interlocking mechanism 20 is achieved via snap members 40 on top piece 8 which engage interlock holes 44 in bottom piece 10. Cord connection area 12 is formed as a multi-toothed member 48 extending from bottom piece 10 and an opposing member 50 extending from top piece 8.

When top piece 8 and bottom piece 10 are folded together in the closed position, the snap members 40 engage interlock holes 44 to interlock top piece 8 and bottom piece 10 in the closed position. The multi-toothed member 48 and opposing member 50 act to crimp, for example, a cord 2 interposed in the cord connection area 12, thereby coupling base section 4 to cord 2. The surrounding collar formed by notches 38 acts to couple the attachment section 6 to base section 4 via, for example, a swivel post interposed in the attachment section mating area 18.

Cord connection area 18 in each of the previously described configurations may be further arranged to provide for a safety release when an overly strong force is applied to cord 2. Such an arrangement may prevent the wearer of the object holding/display system from becoming injured should the system become entangled, e.g. preventing possible strangulation should a badge worn around the neck become caught in a piece of machinery, car door, ski lift, and so forth. For example, crimping arm 30, forked members 42 and multi-toothed member 48 may have generally rounded contact areas for the cord 2, such that the cord 2 may slip out of the base section 4 when a threshold "pull-out" load is exceeded.

Now turning to attachment section 6, attachment section 6 includes a base section mating area 20 at a top end 22 and an attachment mechanism 28 at a bottom end 29. As shown in FIG. 2, an exemplary base section mating area 20 comprises a swivel post 24 having an enlarged cap 26. The attachment section 6 may thereby be attached to base section 4 (once the top piece 8 and bottom piece 10 of base section 4 have been interlocked in the closed position) to form the attachment system 1. An additional benefit of the swivel post 24 is that the attachment section 6 is freely rotatable, thus allowing the object being held/displayed to swivel as needed.

The modular nature of the attachment system according to the present invention permits the use of various attachment sections 6 with the base section 4. The following discussion illustrates two possible attachment sections 6—a gripper and a clip hook—although, as those skilled in the art will recognize, other attachment sections may be implemented in the course of providing an appropriate attachment system as a part of an object holding system or object display system.

As shown by FIGS. 1–4, attachment section 6 may be implemented as a gripper. Detail of an exemplary gripper is given by FIG. 4, which shows a gripper 101 comprising a base portion 102, a base section mating area 104 (implemented as a swivel post 24), and a locking arm 110. The gripping function is achieved in a gripping area by the interaction of a grip section 106 of base portion 102 and the locking arm 110. Grip section 106 includes lower extension 112 and upper extensions 113, each extending outwardly to define a generally U-shaped channel 114. Upper extensions 113 are spaced apart to form a gap 115 between each upper extension 113. U-shaped channel 114 is sized to receive a flexible article, such as a fabric or other flexible material (see FIG. 1). Lower extension 112 extends, for example, the full width of the gripper 101, and has, for example, a serrated inner face 117 in order to grip the flexible article within U-shaped channel 114. For example, serrated face 117 may comprise at least one ridge 118 to grip fabric when the gripper 101 is in a locked position (see below).

Figure 4:
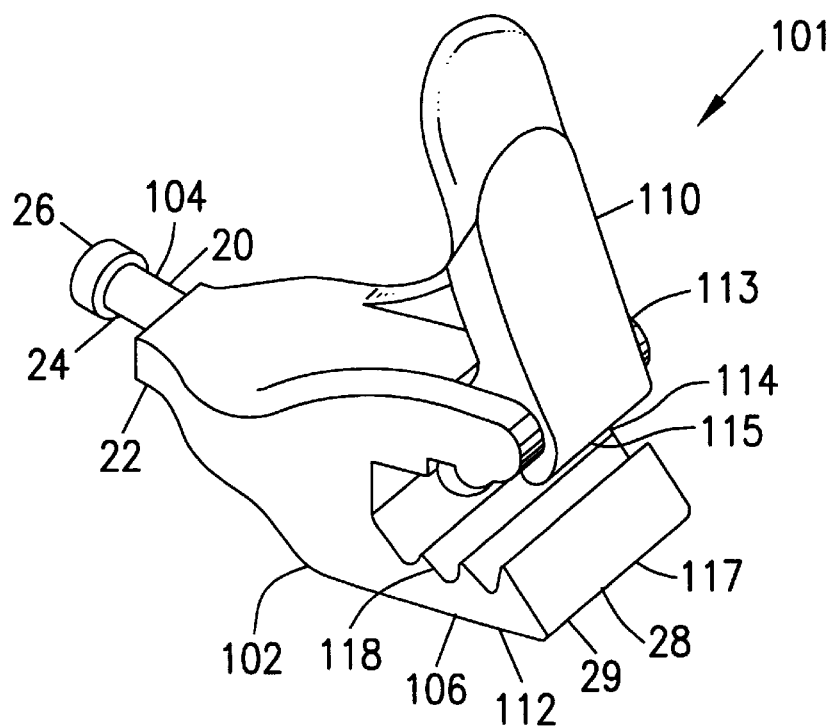
FIG. 4 shows a perspective view of an exemplary gripper element as an attachment section, according to the present invention.

Locking arm 110 is rotatably mounted to the base portion 102, and provided with a locking arm protrusion 111. Locking arm 110 is rotatably movable from an unlocked first position, as shown in FIG. 4, to a second or locked position as shown in FIGS. 1 and 2. Means are provided for selectively rotatably moving the locking arm 110 from the first or unlocked position to the second or locked position. For example, in the exemplary embodiment shown by FIGS. 1, 2 and 4, the means for moving the locking arm 110 from the unlocked position to the locked position comprises a cylindrical element 119 disposed in the gap 115 between upper extensions 113 of the grip section 104, and a corresponding interlocking gap 116 in locking arm 110. Locking arm 110 is mounted to cylindrical element 119 by attachment via interlocking gap 116, for example, by "snap-fit" attachment. Other similar means for rotatable attachment may alternately be used.

When the locking arm 110 is disposed in the unlocked position, an open clearance exists between the serrated face 117 of the lower extension 112 and the locking arm protrusion 111. The open clearance is sufficient to permit, for example, a piece of flexible material to be introduced into and withdrawn from the U-shaped channel 114. When locking arm 110 is rotated into the locked position, it provides a locking clearance between the serrated face 117 of lower extension 112. The locking clearance is smaller than the open clearance, which causes the locking arm protrusion 111 to impinge upon, for example, the flexible material disposed within the U-shaped channel 114, in an amount sufficient to secure the material in the U-shaped channel 114 of the base portion 102. The locking arm protrusion 111 is sized and disposed so that when the flexible material is pulled or tugged in a direction away from the gripper 100, the force applied to the locking arm protrusion 111 causes the locking arm 110 to be urged toward the locked position. Similarly, the at least one ridge 118 of serrated face 117 is disposed such that pulling or tugging the flexible material causes the at least one ridge 118 to provide additional gripping resistance. Thus, a strong connection can be established.

To further explain and illustrate the present invention, the use of the exemplary embodiment in conjunction with a hat (for example, a baseball-style cap) will now be described. Such a use may be necessary, for example, in a windy environment where it is desirable to avoid having the hat blown off a person's head and falling to the ground (for example, running or cycling). Attachment section 6 (implemented as, for example, gripper 101) may be employed to grip the hat at an appropriate location, for example, the back of the hat. Cord 2 of the object holding system 100 may then be worn around the person's neck. If the hat is thereafter blown from the person's head, the attachment made by attachment system 1 grips the hat, and the cord 2, as being worn around the neck, prevents the hat from falling to the ground or otherwise being blown out of the control of the wearer. Thus, the object holding system 100 will prevent the possible loss of the hat.

Attachment section 6 may also be implemented, for example, by a clip hook. An exemplary clip hook is shown in FIGS. 6–8 and 11. Clip hook 200 comprises a hook section 202, a base section mating area 204 (implemented, for example, as a swivel post 24), and a clip section 206. Base section mating area 204 may be engaged with attachment section mating area 18 of base portion 2 in order to couple the clip hook 200 to the base section 2, and thereby form the attachment system 1.

Clip section 206 is implemented as a flexible member, extending from base section mating area 204 to contact hook section 202 at insertion point 208. Thus, to engage hook clip 200 with an object, for example, a key ring, identification badge or whistle, the object need only be forced through insertion point 208, causing clip section 206 to be deflected. Once the object has been fully inserted into hook clip 200 such that it has cleared insertion point 208, hook clip 206 returns to its original position contacting hook section 202, and thus securing the object within hook clip 200 (see FIG. 8).

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A modular attachment system, comprising:
   a base section having an attachment section mating area and a cord connection area, the base section comprising a top piece and a bottom piece; and
   an attachment section having a base section mating area;
   wherein the base section is coupled to the attachment section by engagement of the attachment section mating area and the base section mating area and interlocking of the top piece and bottom piece, and wherein the base section is connected via the cord connection area to a cord.

2. The modular attachment system of claim 1, wherein at least one of the base section and the attachment section is constructed of molded plastic.

3. The modular attachment system of claim 1, wherein the base section is formed when the top piece and the bottom piece are interlocked in a closed position.

4. The modular attachment system of claim 3, wherein the top piece is rotatably connected to the bottom piece via at least one protruding pin and receiving hole, and wherein the base section is formed by rotating the top piece to interlock with the bottom piece in the closed position.

5. The modular attachment system of claim 1, wherein the top piece is connected to the bottom piece via a hinge area, and wherein the base section is formed by folding the top piece to interlock with the bottom piece in the closed position.

6. The modular attachment system of claim 1, wherein the top piece is separate from the bottom piece, and wherein the base section is formed by mating the top piece to interlock with the bottom piece in the closed position.

7. The modular attachment system of claim 1, wherein the attachment section comprises a clip hook.

8. The modular attachment system of claim 1, wherein the attachment section comprises a gripper.

9. The modular attachment system of claim 1, wherein the base section is rotatably coupled to the attachment section.

10. The modular attachment system of claim 9, wherein the base section mating area comprises a swivel post.

11. The modular attachment system of claim 10, wherein the attachment section mating area comprises a surrounding collar.

12. The modular attachment system of claim 11, wherein the base section is engaged with the attachment section by interposing the swivel post in the surrounding collar.

13. An object holding and display system, comprising:
   a cord; and
   a modular attachment system coupled to the cord and comprising
   a base section having a cord connection area and an attachment section mating area, the base section comprising a top piece and a bottom piece, and
   an attachment section having a base section mating area;
   wherein the base section is coupled to the attachment section via engagement of the base section mating area and the attachment section mating area and interlocking of the top piece and bottom piece, and wherein the base section is coupled to the cord via the cord connection area.

14. The object holding and display system of claim 13, wherein the attachment section comprises a snap clip.

15. The object holding and display system of claim 13, wherein the attachment section comprises a gripper.

16. The object holding and display system of claim 13, wherein at least one of the base section and the attachment section is constructed of molded plastic.

* * * * *

UNITED STATES PATENT AND TRADEMARK OFFICE
CERTIFICATE OF CORRECTION

PATENT NO.   : 5,842,256
DATED        : December 1, 1998
INVENTOR(S)  : Anscher

Figure 7:
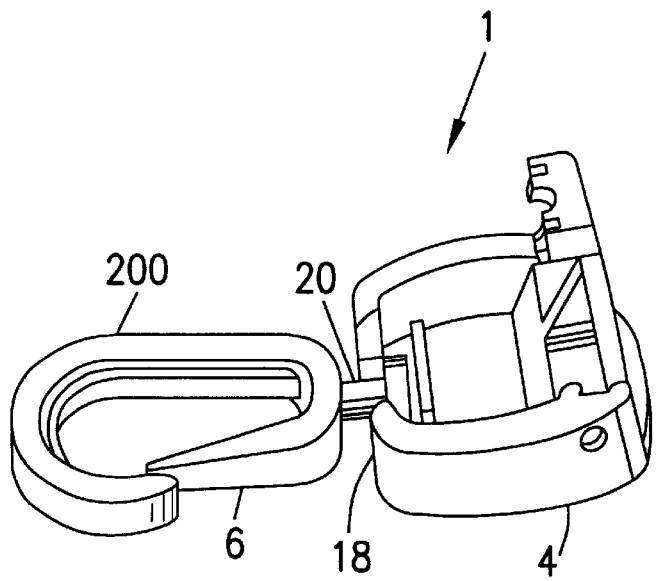
FIG. 7 shows a perspective view of an exemplary attachment system using a clip hook as the attachment section, according to the present invention.
Figure 8:
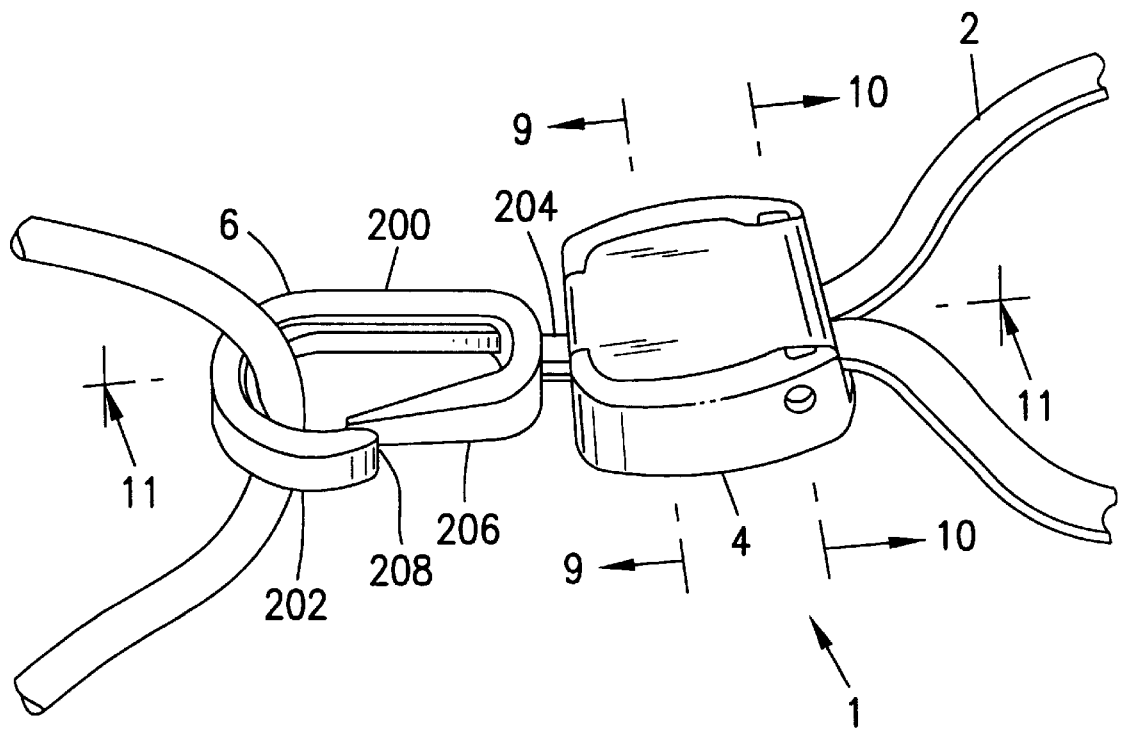
FIG. 8 shows a perspective view of the exemplary attachment system using a clip hook as the attachment section and engaged with a cord and an object, according to the present invention.
Figure 10:
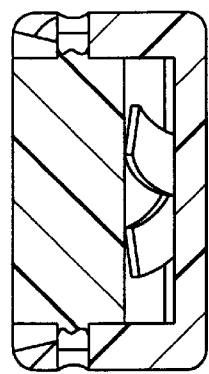
FIG. 10 shows a cross-sectional view of the base section of FIG. 8 along the line 10—10.
Figure 9:
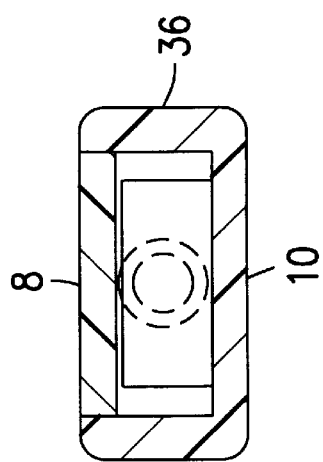
FIG. 9 shows a cross-sectional view of the base section of FIG. 8 along the line 9—9.
Figure 11:
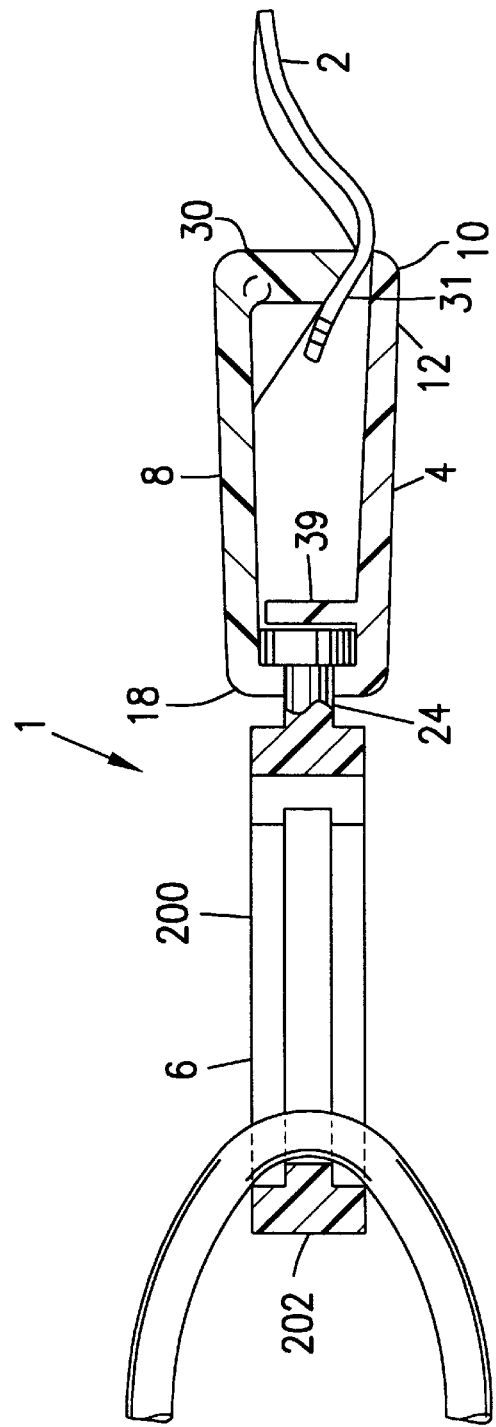
FIG. 11 shows a cross-sectional view of the exemplary attachment system of FIG. 8 along the line 11—11.

It is certified that error appears in the above-identified patent and that said Letters Patent is hereby corrected as shown below:

Delete Drawing Sheets 1, 2 and 4 and substitute therefor the Drawing Sheets consisting of FIG 2, 4 and 7 as shown on attached pages Drawings,
Sheet 1, Fig. 2, reference line and reference number "20" of the base section mating area have been deleted and replaced with reference line and reference number -- 104 --;
Sheet 2, Fig. 4, reference line and reference number "20" have been deleted; and
Sheet 4, Fig. 7, reference number "20" have been deleted and replaced with reference number -- 204 --.

Column 1,
Line 56, change "and multi-toothed" to -- and a multi-toothed --;

Column 2,
Line 31, change "FIG. 13" to -- FIG. 12 --;
Line 33, change "FIG. 14" to -- FIG. 13 --;
Line 39, change "FIGS. 1-14" to -- FIGS. 1-13 --;

Column 3,
Line 65, change "FIG. 13" to -- FIG. 12 --;

Column 4,
Line 10, change "member 40" to -- members 40 --;
Line 24, change "FIG. 14" to -- FIG. 13 --;
Line 65, change "a base section mating area 20" to -- a base section mating area 104 --;
Line 67, change "base section mating area 20" to -- base section mating area 104 --;

Column 5,
Line 47, change "grip section 104" to -- grip section 106 --;

Column 6,
Line 2, change "gripper 100" to -- gripper 101 --;
Lines 36-37, change "hook clip 200" to -- clip hook 200 --;
Lines 40-43, change "hook clip 200" to -- clip hook 200 --;

UNITED STATES PATENT AND TRADEMARK OFFICE
CERTIFICATE OF CORRECTION

PATENT NO. : 5,842,256
DATED : December 1, 1998
INVENTOR(S) : Anscher

It is certified that error appears in the above-identified patent and that said Letters Patent is hereby corrected as shown below:

Column 8,
Line 7, change "comprising" to -- comprising: --; and
Line 21, change "snap clip" to -- clip hook --.

Signed and Sealed this

Second Day of August, 2005

JON W. DUDAS
*Director of the United States Patent and Trademark Office*